Figure 1:
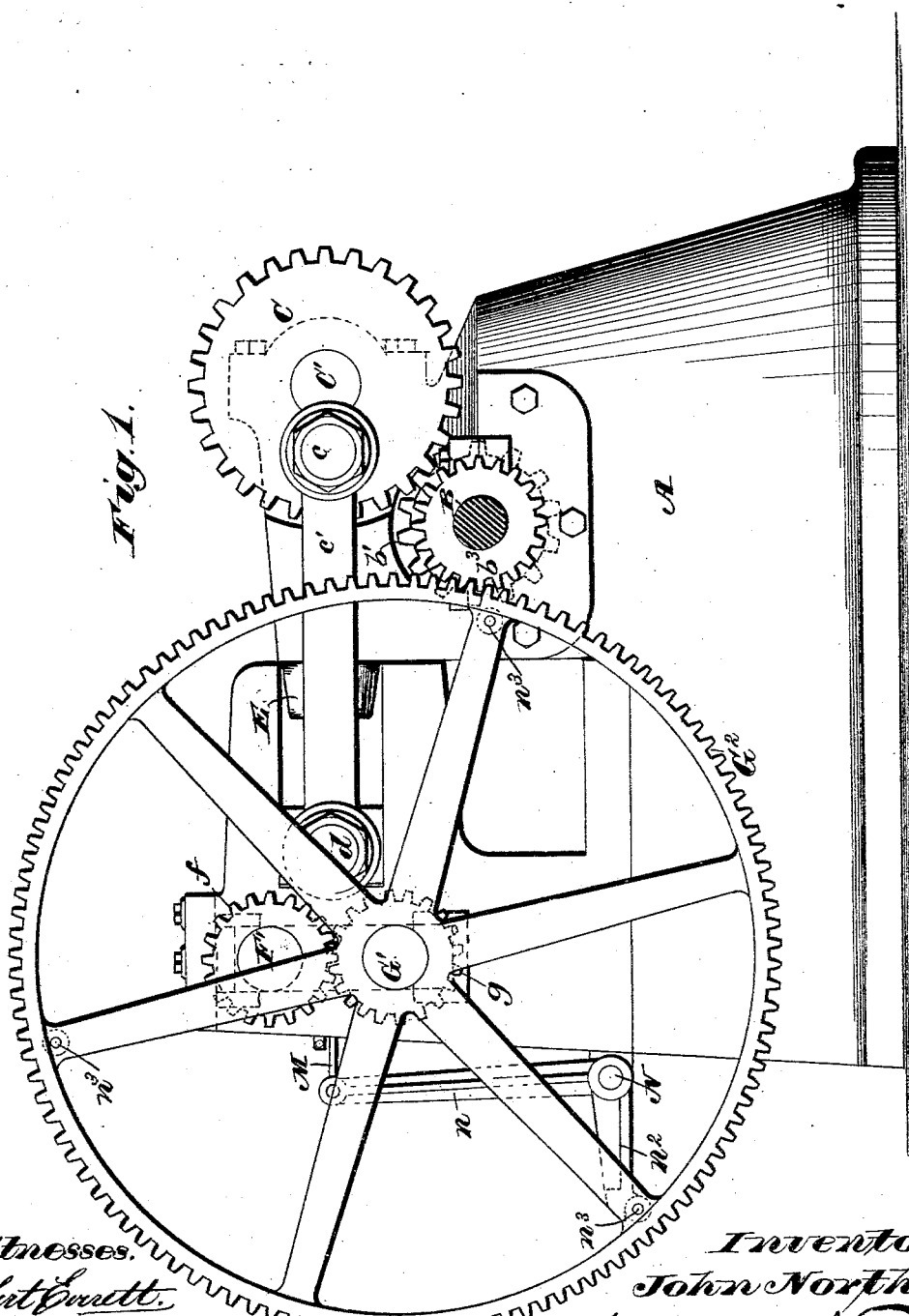

(No Model.) 8 Sheets—Sheet 1.
J. NORTH.
MACHINE FOR MAKING SPIKES.
No. 303,945. Patented Aug. 19, 1884.

Witnesses.
Robt Everett.
George W. Rea

Inventor:
John North.
By James L. Norris.
Atty (No Model.)

8 Sheets—Sheet 2.

J. NORTH.
MACHINE FOR MAKING SPIKES.

No. 303,945. Patented Aug. 19, 1884.

Fig. 2.

Witnesses.
Robert Everett.
George W. Rea.

Inventor:
John North.
By
James L. Norris.
Atty.

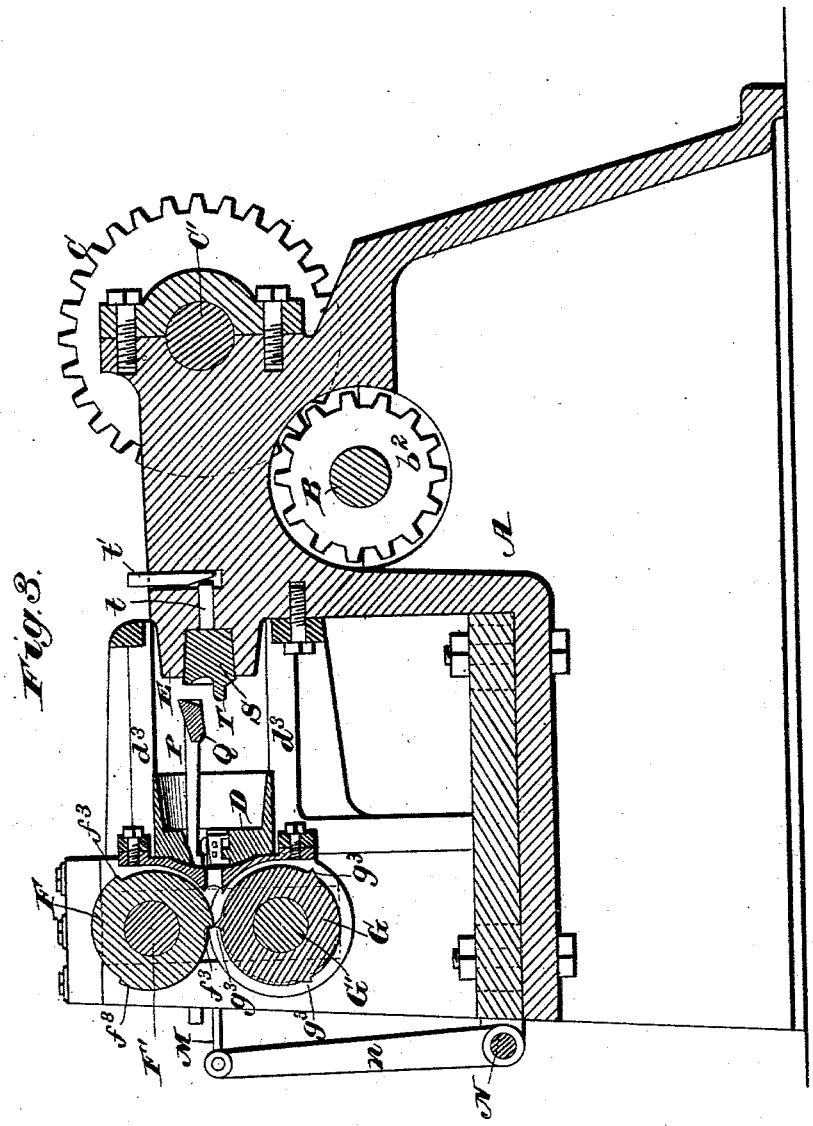

(No Model.)  8 Sheets—Sheet 4.
J. NORTH.
MACHINE FOR MAKING SPIKES.
No. 303,945.  Patented Aug. 19, 1884.
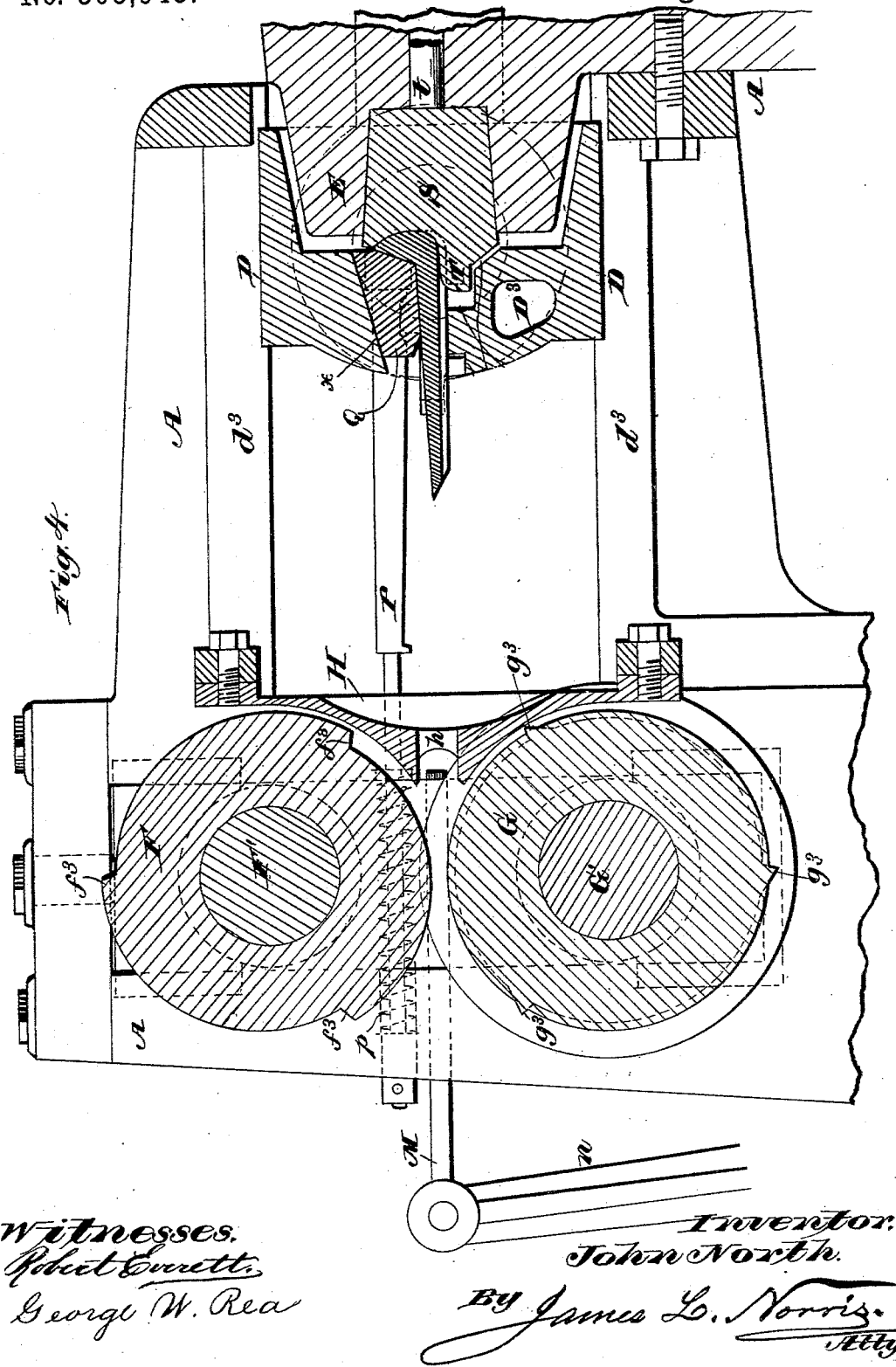

(No Model.)  8 Sheets—Sheet 5.
J. NORTH.
MACHINE FOR MAKING SPIKES.
No. 303,945.  Patented Aug. 19, 1884.
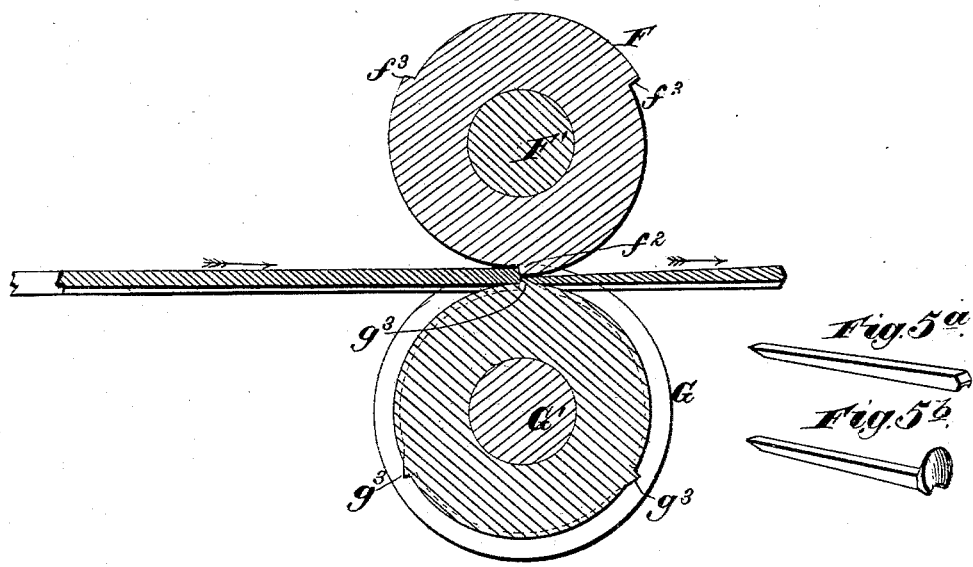
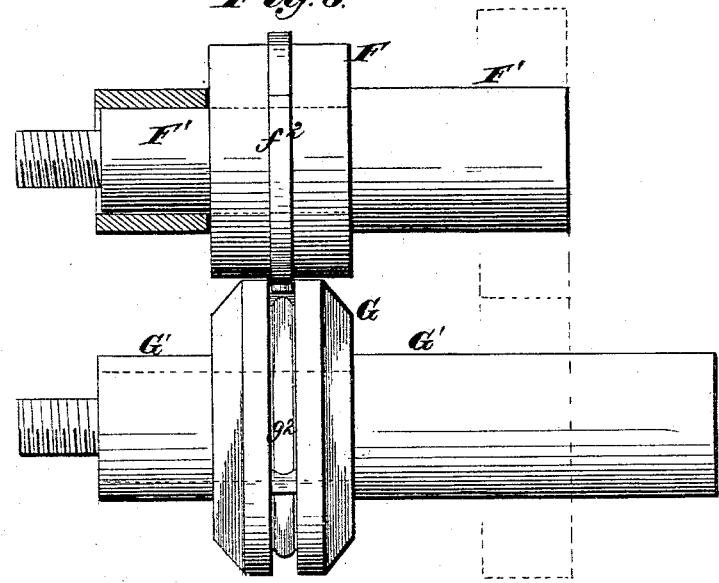
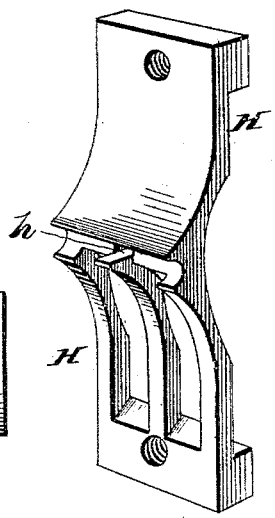
Witnesses.
Robert Everett
George W. Rea.
Inventor:
John North
By James L. Norris.
Atty.

(No Model.) 8 Sheets—Sheet 6.
J. NORTH.
MACHINE FOR MAKING SPIKES.
No. 303,945. Patented Aug. 19, 1884.
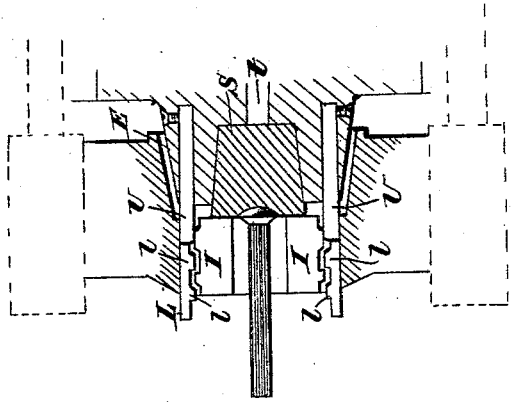
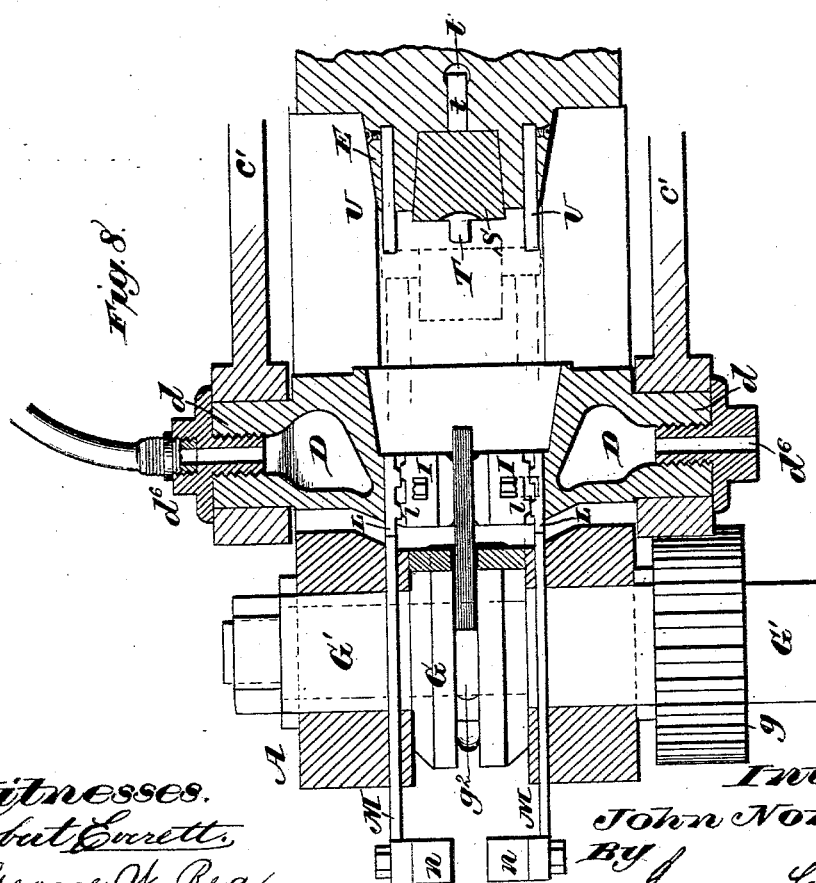
Witnesses.
Robert Everett,
George W. Rea
Inventor:
John North,
By James L. Norris.
Att'y.

(No Model.) 8 Sheets—Sheet 7.

J. NORTH.
MACHINE FOR MAKING SPIKES.

No. 303,945. Patented Aug. 19, 1884.

Witnesses,
Robert Everett,
George W. Rea.

Inventor,
John North,
By James L. Norris,
Atty.

(No Model.) J. NORTH. 8 Sheets—Sheet 8.
MACHINE FOR MAKING SPIKES.
No. 303,945. Patented Aug. 19, 1884.
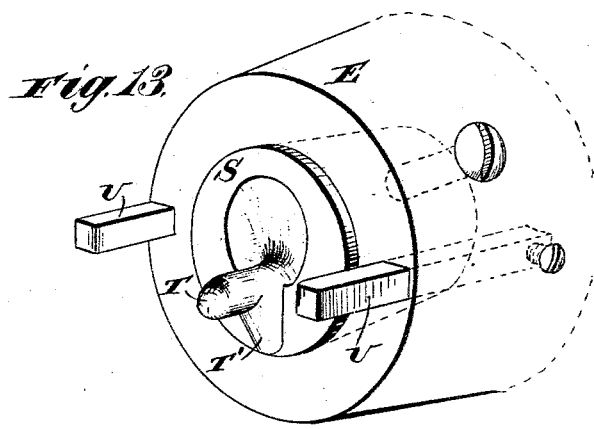
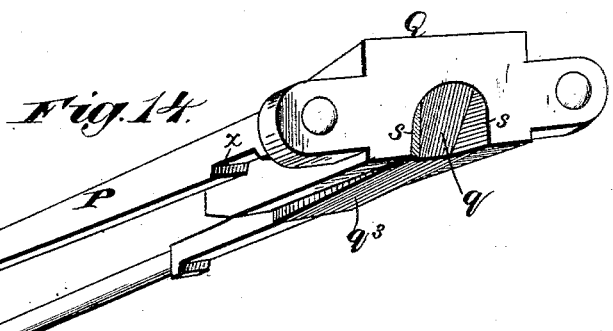
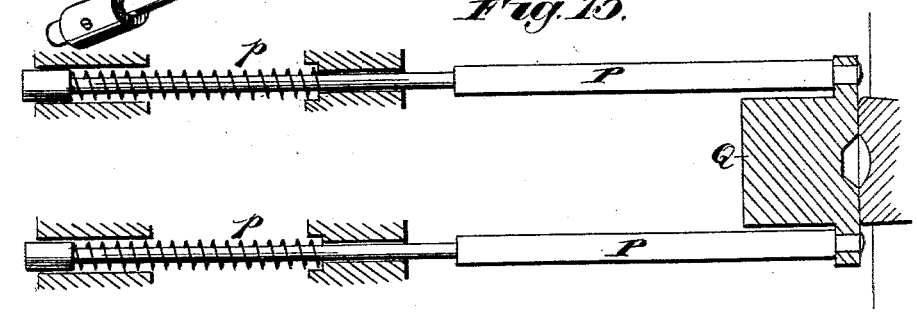
Witnesses.
Robert Everett.
George W. Rea.
Inventor:
John North,
By James L. Norris.
Atty.

UNITED STATES PATENT OFFICE.

JOHN NORTH, OF MIDDLETOWN, CONNECTICUT.

MACHINE FOR MAKING SPIKES.

SPECIFICATION forming part of Letters Patent No. 303,945, dated August 19, 1884.

Application filed February 19, 1884. (No model.)

*To all whom it may concern:*

Be it known that I, JOHN NORTH, a citizen of the United States, residing at Middletown, in the county of Middlesex and State of Connecticut, have invented new and useful Improvements in Machines for Making Spikes, of which the following is a specification.

The present invention relates to that class of machines for making hook-headed or railroad spikes in which are employed feeding and pointing rolls and means for presenting the severed spike-blank to heading devices.

The object of the invention is to provide a machine which is simple and effective in operation and more compactly organized than other spike-machines heretofore devised, special provision being also made for obtaining a continuous operation of the feeding and pointing rolls and heading devices, and insuring the formation of perfect heads by swaging or upsetting the metal of the blank, in contradistinction to the sudden percussive force applied by a heading-hammer, as in the machines in general use.

Another object of the invention is to provide such an arrangement of the spike-blank carrier and gripping and heading dies that a perfect and constant cooling thereof is effected, and the destruction or wear thereof, as also sticking, is prevented by the red-hot spike-blanks presented by said devices to a stationary heading-anvil.

Having briefly outlined the ends to be attained by my present invention, I would state that the same will be hereinafter fully described, and then indicated in the claims.

Figure 10:
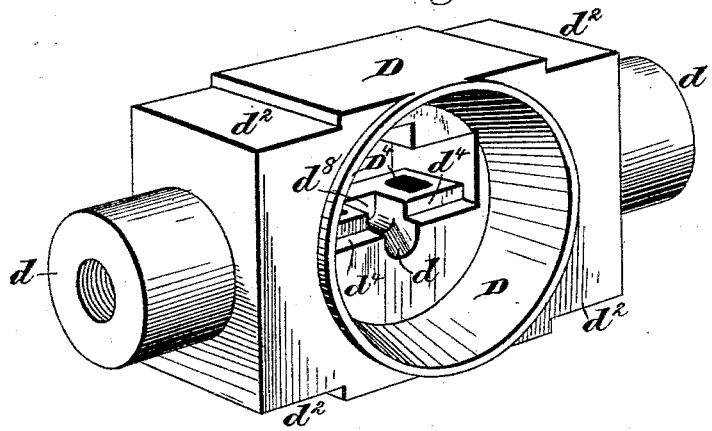
Figure 11:
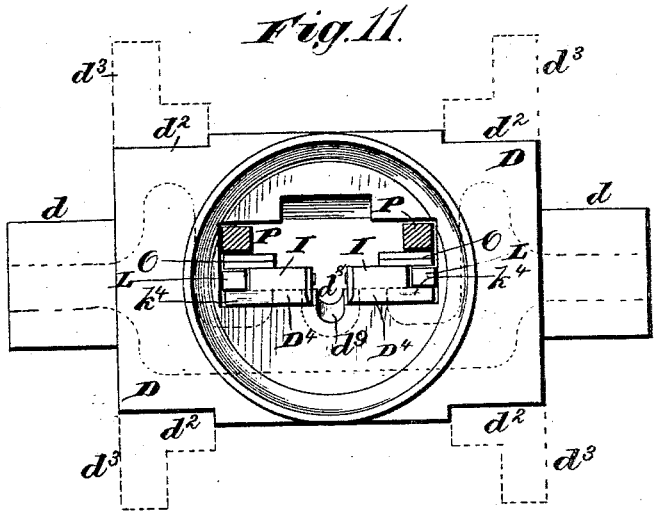
Figure 12:
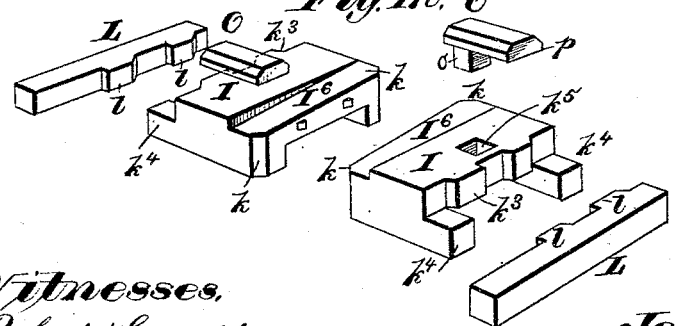

In the drawings, Figure 1 is a side elevation of a spike-machine, showing the relative arrangement and sizes of the gear-wheels for imparting motion to the feeding and pointing rolls, the reciprocating die-holder, and blank-carrier, and the means for tightening the gripping-dies in the reciprocating die-holder. Fig. 2 is a plan or top view of a complete machine organized for making spikes. Fig. 3 is a vertical longitudinal section of a complete machine, showing the reciprocating die-holder and blank-carrier in position for receiving a severed blank from the feeding and pointing rolls, and exhibiting the heading-die which enters said die-holder and co-operates with a stationary anvil. Fig. 4 is an enlarged vertical sectional view of the feeding and pointing rolls, the reciprocating die holder and blank-carrier, and the heading-dies and stationary anvil, the parts being shown in position for performing the heading operation. Fig. 5 is a detail sectional view of the feeding and pointing rolls, with the spike rod or bar in position between the same, and showing a spike-blank rolled with a tapering body. Figs. 5$^a$ and 5$^b$ represent the spike-blank and a finished or headed spike. Fig. 6 is a plan or face view of the feeding and pointing rolls adapted for use with a grooved spike rod or bar. Fig. 7 is a detail view of a slotted stripper-plate located in front of the feeding and pointing rolls. Fig. 8 is an enlarged horizontal sectional view representing the position of the reciprocating die-holder and gripping-dies when taking a spike-blank from the feeding and pointing rolls. Fig. 9 is an enlarged detail sectional view of the reciprocating die-holder, gripping-dies, stationary anvil, and means for loosening the keys of the gripping-dies. Fig. 10 is an enlarged perspective view of the reciprocating die-holder, showing the seats thereon for the gripping-dies and tightening-keys. Fig. 11 is an enlarged front view of the reciprocating die-holder with the gripping-dies in position, and representing by dotted lines the water-chambers in said die-holder. Fig. 12 exhibits the gripping-dies and the tightening-keys thereof in detail. Fig. 13 is an enlarged perspective view of the anvil-block, stationary heading-die, and projections for loosening the keys of the gripping-dies without releasing the hold of the latter upon the spike-blank. Fig. 14 is an enlarged perspective view of the heading-die and its spring-encircled guide-stems, said heading-die opening in connection with the heading-die of the stationary anvil; and Fig. 15 is an enlarged sectional view of the two heading-dies, showing also the spring-rods of the movable die.

The letter A designates the frame-work of the machine, which is strongly or substantially made, and affords bearings for all the working parts, and is capable of withstanding all the jars incident to the operation of the machine.

At or near one end of the frame-work is located the main driving-shaft B, which has a pulley, $b$, for communicating motion thereto, and is provided with two spur-wheels, $b'$ $b^2$. These spur-wheels engage with two spur-wheels, C, which have double the number of teeth of the wheels $b'$ $b^2$, and are fitted on a transverse shaft, C', having its bearings at the end of the frame-work A. Wrist-pins $c$, applied to the faces of the spur-wheels C, receive connecting-rods or pitmen $c'$, which are hung on trunnions or cylindrical projections $d$ of a reciprocating hollow block, D, that has suitable top and bottom seats, $d^2$, resting on stationary ways or guide-rails $d^3$ of the frame-work A. The block D is capable of sliding back and forth between a stationary die or abutment, E, on a vertical wall of the frame-work, and a pair of feeding and pointing rolls, F G; and it will be evident that this movement of the block D takes place alternately in opposite directions by means of the spur-wheels, wrist-pins, and connecting-rods, heretofore referred to. The two feeding and pointing rolls F G are fitted on shafts F', G', which are geared together, so as to run in the opposite direction, as indicated by the arrows, and at the same rate of speed, by means of the spur-wheels $f$ $g$. The shaft of one of said rolls carries a large spur-wheel, $G^2$, which has six times the number of teeth of a third spur-wheel, $b^3$, fitted on the driving-shaft B, and thus it is evident that said spur-wheel $G^2$ will revolve once while the main shaft makes six revolutions. The feeding and pointing rolls are in the present instance shown as adapted to operate upon a grooved bar or rod direct from the rolls without being reheated, from which the spike-blanks are cut by said rolls ready for subsequent presentation to heading devices, the final product being a hook-headed spike having a tapering body grooved throughout its entire length as well as the body, as is shown in Fig. 5$^{\text{b}}$. As shown in Figs. 5 and 6, the upper roll, F, has a circumferential rib or projection, $f^2$, or center die, provided at regular intervals with cutting-edges and pointing-dies $f^3$, and the lower roll has a circumferential groove, which has its bottom $g^2$ shaped to enter into the groove in the spike-rod, and is also provided with cutting-edges and pointing-dies $g^3$, operating in connection with the cutters and pointing-dies $f^2$ of the upper roll, so as to cut the rod into blanks of the required length and properly point said blanks. These dies on the rollers are shaped so as to form a spike-blank having a tapering grooved body extending through the body and head, which is preferable to the ordinary flat-faced body. When flat-faced spikes, however, are to be made, the shape of the feeding and pointing rolls is properly modified.

At the discharge side of the feeding and pointing rolls is located a vertical plate or grating, H, which lies in close contact with the peripheries of said rolls, and serves, primarily, as a stripper to prevent the severed spike-blanks from being carried around by said rolls. This plate H is secured to the frame-work of the machine, and has an opening, $h$, located in line with the space between the two rolls, so that the spike-blanks passing from said rolls are conducted through the plate H to gripping-dies I, seated in the hollow reciprocating block D. The end of this block D which comes in contact with the plate H and the adjoining parts of the frame-work is somewhat convex, as is shown in Figs. 3 and 8, and the plate H has a concave face for receiving the said block D. The object of this conformation is to allow the reciprocating block to come up as close as possible to the feeding and pointing rolls and allow the gripping-dies seated in said block to grasp the severed spike-blank at a proper distance from its front end, so as to allow a sufficient portion of metal for the spike-head to project beyond said gripping-dies. The reciprocating block D, which may be termed the "die-holder" and "blank-carrier" is open at its front and rear, and comprises a shell-shaped body having interior seats or ledges, $d^4$, for receiving and supporting laterally-movable gripping-dies. The shape thereof is clearly indicated in Fig. 10, while the arrangement of the dies in the block D is illustrated in Fig. 11. It will be seen that the gripping-dies have vertical faces $k$, between which the spike-blank is seized. The gripping-dies are brought toward each other at the proper time for firmly grasping the spike-blank that is projected through the stripper-plate and entered between the gripping-dies by the action of the rolls, and as means for closing the dies upon the spike-blank I have herein shown keys L, which have projections $l$, that interlock with projections $k^3$ on the gripping-dies. These keys are tightened in their seats when the die-block is in the position shown in Fig. 8 by means of push-rods or "knockers" M, which are opened by means of a rock-shaft, N, having vertical arms $n$ connected with said knockers M, said rock-shaft itself having a crank-arm, $n^2$, which is engaged by rollers or other projections, $n^3$, on the large spur-wheel whenever the gripping-dies are receiving a spike-blank. The keys L, for tightening the gripping-dies in the above-described manner, slide upon projections $k^4$ of said dies, and are fitted between the projections $k^3$ and the side walls of the block D. (See Fig. 12.) The vertical displacement of the keys is prevented by means of small plates O, which have lugs $o$, that enter openings $k^5$ in the dies I, said plates themselves overlapping the keys L, and being held in place by the longitudinal stems P of a movable heading-die, Q, as will be hereinafter explained. The block D, which comprises the die-holder and blank-carrier, has chambers $D^3$, or is made hollow, so as to receive a supply of water as a cooling medium, the inflow and outflow of the water taking place through the hollow trunnions or projections $d$, as is clearly indicated in Fig. 8. Screw-sockets $d^6$, fitted in said trunnions, have openings for the entrance and discharge of the water, and, as the block D slides back and forth, it is obvious that the water is received through a flexible supply-pipe.

In Figs. 10 and 11 I have shown vertical openings $D^4$, for causing water from the main chambers to come in direct contact with the gripping-dies resting upon the surfaces in which said vertical openings are made.

By providing means for cooling the die-holder D and the parts carried thereby, I effectually guard against the destruction or wear thereof by the spike-blanks that are presented in a red-hot condition to the heading devices.

It has heretofore been stated that the reciprocating block moves back and forth between the feeding and pointing rolls and the anvil-shaped abutment E on a vertical wall of the frame-work A. In Fig. 13 said anvil is illustrated in detail, and in Fig. 4 is shown its adaptability to receive or enter into the die-holder D in the performance of the heading operation. This anvil E has a socket for the reception of a detachable block, the front face of which forms the stationary heading-die S, and has a beak or nose shaped projection, T, strengthened by an inclined rib, T', for the object hereinafter explained. The die-block is held in its seat by a set-screw or other suitable means, and may have a stem, $t$, which projects into a vertical opening intersecting with the horizontal seat for the die-block. A key, $t'$, passed into said vertical opening, may be resorted to for loosening the die-block in its seat, as is indicated in Fig. 3. The movable heading-die Q (shown in detail in Figs. 14 and 15) is fitted on longitudinal stems or rods P, which pass through the die holder or block D, and have bearings in the frame-work of the machine. The rear portions of the stems P are encircled by springs $p$, the tendency of which is to hold the die-block Q in a projected state, or in the position seen in Fig. 4. The front face of the die-block Q constitutes the die $q$ proper, and is simply an inclined depression in said front face. The upper face of the die-block Q is also inclined, and conforms to the interior top surface or roof of the opening in the die-holder and blank-carrier D. Furthermore, the bottom surface of the die-block Q is inclined, as is shown at $q^3$, and fits upon the correspondingly-inclined top surfaces of the two gripping-dies I, these inclined surfaces being clearly indicated by the letter $I^6$ in Fig. 12. When the die-holder D is in the position shown in Figs. 3 and 8 and the gripping-dies are receiving the spike-blank, the movable heading-die is in a projected state, or is located near the stationary heading-die, and when the die-holder moves forward its central opening receives the die-block Q, which is caused to fit snugly upon the aforesaid inclined surfaces.

The stems or rods P, which support the upper or movable die, Q, are raised and lowered by the action of the plates O, which enter the openings in the tops of the gripping-dies I. In order to permit this vertical movement of the movable heading-die to take place, its spring-encircled stems are fitted in slots of a sufficient height, and hence it is plain that said die can rise so as to prevent the thickest end of the blank, or that part which is projected beyond the gripping-dies, from striking said movable heading-die and obstructing the free passage of the blank. At the proper time the recesses or notches $x$, Fig. 14, in the arms of the heading-die allow the latter to drop into position as seen in Fig. 4. As soon as the portion of the spike-blank left projecting beyond the die-block Q and the gripping-dies comes in contact with the beak or nose T of the stationary die, the slight upward inclination given to the spike-blank by said beak or nose will cause the metal of the blank to be slightly turned upward between the two die-surfaces $q$ S in such a way as to avoid the disadvantages of a direct horizontal presentation for turning upward of the end of the spike-blank. The beak or nose T of the stationary heading-die passes under the spike-blank held by the gripping-dies and enters the horizontal cavity or seat $d^5$ in the block D, and the inclined vertical rib T', extending from the rear of said nose T, passes into a corresponding recess or groove, $d^9$, at the front of the cavity $d^8$, such formation being clearly seen in Fig. 4. In this manner the spike-blank is supported at all points during the performance of the heading operation, and the formation of perfect or well-shaped heads is always insured.

Prior to the completion of the heading operation, the keys which have hitherto held the gripping-dies firmly closed upon the spike-blank are loosened or forced back by contact with stems U, projecting from the anvil-block. These stems, however, while loosening the keys, themselves take the place of the latter and bear upon the gripping-dies, so as to hold the same closed until the completion of the heading operation. After the head has been formed the die-holder D is again carried toward the feeding and pointing rolls, and as it recedes from the movable heading-die the latter is returned to its normal position by the action of its spring-encircled stems. The hold of the gripping-dies upon the finished spike having previously been loosened by the withdrawal of the locking-keys and the separation of the gripping-dies caused by the sudden removal of the stems U, the finished spike, having no longer a support, is free to drop into a suitable receptacle beneath the machine. Then as the die-holder reaches the feeding and pointing rolls a spike-blank is again seized by the gripping-dies, and the latter are tightened, and the die-holder moves forward for repeating the heading operation, as will readily be manifest.

The machine organized as above described is adapted for making spikes of a uniform or the same length. If different-sized spikes are designed to be made in the same machine, I make provision therefor by fitting the feed and pointing rolls and adjoining parts upon an adjustable frame or stand, so as to enable the distance between said rolls and the heading devices to be varied.

The salient features of a machine constructed as above described are the continuously-operating feed and pointing rolls and reciprocating die-holder, whereas in ordinary machines said rolls and the feeding devices act intermittently.

Having thus described my invention, what I claim as new, and desire to secure by Letters Patent, is—

1. In a spike-machine, the combination of the reciprocating die-holder having a longitudinal blank-opening and laterally-movable gripping-dies, the movable heading-die, and the means for supporting the latter independently of the die-holder and the stationary heading-die, with the frame carrying said heading-die at one end and the blank feeding and pointing devices at the other end, substantially as herein set forth.

2. In a spike-making machine, the combination of the reciprocating die-holder and blank-carrier, the movable gripping-dies seated therein, the movable keys for closing the dies, and the suitable devices for tightening and loosening the keys at the limit of movement of said die-holder, with the blank feeding and pointing devices and the heading mechanism, substantially as herein set forth.

3. In a spike-making machine, the combination of a reciprocating die-holder and blank-carrier having a hollow body or chamber for the circulation of a cooling medium therethrough, with the gripping-dies and feeding and pointing and heading devices, substantially as herein set forth.

4. In a spike-making machine, the combination of the reciprocating die-holder and blank-carrier, the movable heading-die adapted to be carried forward by said die-holder, and the stationary heading-die, with the continuous feeding and pointing devices and the gripping-dies for grasping the spike-blank in the die-holder until after the completion of the heading operation, substantially as herein set forth.

5. In a spike-making machine, the combination of the movable heading-die and the spring-encircled guide-stems thereof with the reciprocating die-holder and blank-carrier, the gripping-dies, the stationary heading-die, and the blank feeding and pointing devices, substantially as herein set forth.

6. The combination of the concave-faced stripper-plate and the reciprocating die-holder and blank-carrier, having a convex face, with the feeding and pointing rolls and the devices for heading the blank carried through the stripper-plate by the reciprocating die-holder, substantially as described.

7. In a spike-making machine, the combination of the reciprocating die-holder and blank-carrier having a water-chamber, a longitudinal opening, and apertured ledges or seats for gripping-dies, to allow the flow of water to the latter, with the feeding and pointing and heading devices, substantially as herein set forth.

8. In a spike-making machine, the combination of the movable heading-die having a front die-surface and inclined top and bottom surfaces, and the spring-encircled supporting and guide stems, and the reciprocating die-holder and blank-carrier having a longitudinal opening and inclined top surface, and the gripping-dies having inclined top surfaces, with the feeding and pointing devices and a stationary heading-die, substantially as herein set forth.

9. In a spike-making machine, the combination of the stationary heading-die having projecting stems U, with the reciprocating die-holder or blank-carrier, the movable gripping-dies, and the keys for tightening said dies, substantially as described.

10. In a spike-making machine, the combination of the sliding knockers or stems M, the rock-shaft and connecting-arms, and the operating gear-wheel with the movable die-holder and blank-carrier having the gripping-dies and keys for tightening the same operating in conjunction with the aforesaid knockers, and the feeding and pointing rolls and the heading devices, substantially as described.

In testimony whereof I have hereunto set my hand in the presence of two subscribing witnesses.

JOHN NORTH.

Witnesses:
 JAMES L. NORRIS,
 JOS. L. COOMBS.